(12) United States Patent
Lin

(10) Patent No.: US 8,091,911 B2
(45) Date of Patent: Jan. 10, 2012

(54) DOUBLE WING BICYCLE FENDER

(75) Inventor: Chong-Jiang Lin, Taichung County (TW)

(73) Assignee: Sunny Wheel Industrial Co., Ltd., Changhua County (TW)

( * ) Notice: Subject to any disclaimer, the term of this patent is extended or adjusted under 35 U.S.C. 154(b) by 368 days.

(21) Appl. No.: 12/505,389

(22) Filed: Jul. 17, 2009

(65) Prior Publication Data
US 2011/0012323 A1 Jan. 20, 2011

(51) Int. Cl.
B62J 27/00 (2006.01)
B62J 9/00 (2006.01)
B62D 25/18 (2006.01)
(52) U.S. Cl. ............... 280/304.3; 280/288.4; 280/152.3
(58) Field of Classification Search ............ 293/50, 293/105, 114, 115, 119, 118, 112; 296/192; 280/288.4, 304.3, 152.3, 152.2, 159, 160, 280/847, 848, 849, 850, 851
See application file for complete search history.

(56) References Cited

U.S. PATENT DOCUMENTS

| | | | | |
|---|---|---|---|---|
| 528,298 A * | 10/1894 | Kerr | ................................ | 293/36 |
| 557,488 A * | 3/1896 | Cherry | ........................ | 296/78.1 |
| 614,007 A * | 11/1898 | Kiddier | ....................... | 280/152.3 |
| 3,610,660 A * | 10/1971 | Price | ........................... | 280/288.4 |
| 4,536,005 A * | 8/1985 | Tanaka et al. | ................ | 296/78.1 |
| 6,196,567 B1 * | 3/2001 | Lynam et al. | ............. | 280/288.4 |
| 7,997,601 B2 * | 8/2011 | Lin | ............................ | 280/152.3 |

FOREIGN PATENT DOCUMENTS

JP 2004036171 A * 2/2004

* cited by examiner

Primary Examiner — Joanne Silbermann
Assistant Examiner — Daniel Yeagley

(57) ABSTRACT

A double wing bicycle fender is mounted on a frame pipe of a bicycle. When in use, a fender main body of the roll-up bicycle fender can be pulled out into an operative position at both sides of the shaft to increase the effective width of the fender for blocking the splashing of mud, water and road debris, and can also be rolled up on the shaft and collected in a holding body, thus it not only saves space but is aesthetically pleasing.

10 Claims, 6 Drawing Sheets

2

DOUBLE WING BICYCLE FENDER

BACKGROUND OF THE INVENTION

1. Field of the Invention

The present invention relates to a bicycle fender, and more particularly to a double wing bicycle fender, wherein the fender main body can be rolled up on a shaft or can stretch out at both sides of the shaft to increase the effective width of the fender, which not only saves space but is aesthetically pleasing.

2. Description of the Prior Art

Bicycle fender is mounted above the wheels of a bicycle to protect rider from mud, dust and road debris. Most of the existing types of the bicycle fenders are arc-shaped, and this arc-shaped type of bicycle fender is only as wide as the width of the wheels as long as it can cover the wheels. However, the fender will be too narrow to fully block the splashing of water or mud when riding through mud or puddles.

The present invention has arisen to mitigate and/or obviate the afore-described disadvantages.

SUMMARY OF THE INVENTION

The primary object of the present invention is to provide a double wing bicycle fender, wherein the fender main body can be rolled up on a shaft or can stretch out at both sides of the shaft to increase the effective width of the fender, which not only saves space but is aesthetically pleasing.

To achieve the above object, a double wing bicycle fender in accordance with the present invention comprises: a mounting member, a pivoting end cap, a directional assembly, a holding body and a fender main body. The mounting member is a laminate structure and mounted on a bicycle. The pivoting end cap has one end pivoted to the mounting member and the other end defined with a pivoting portion. The directional assembly includes a directional seat and at least one movable member, the directional seat is placed into the pivoting portion of the pivoting end cap and includes at least one directional portion, the movable member is pivotally disposed in the pivoting portion of the pivoting end cap and provided with a plurality of positioning angles and a connecting portion, the positioning angles of the movable member is engaged with the directional portion of the directional seat. The holding body the pivoting end cap is disposed at one end of the holding body. The fender main body includes a shaft and at least one wing with one end fixed to and rolled up on the shaft, the shaft is pivotally inserted in the holding body, and the other end of the wing extends out of a lateral side of the holding body and is connected to the connecting portion of the movable member.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
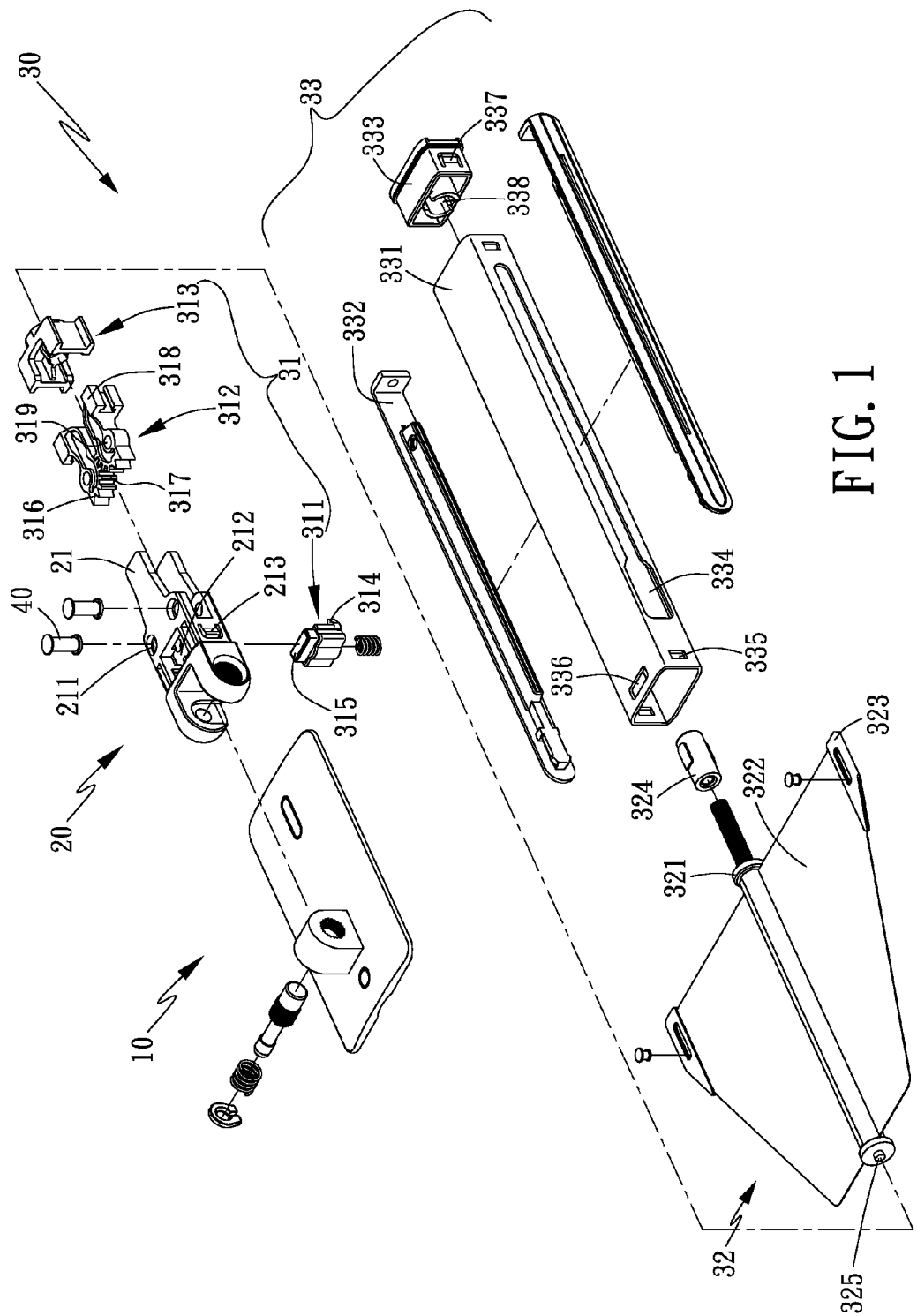
FIG. 1 is an exploded view of a double wing bicycle fender in accordance with the present invention.
Figure 2:
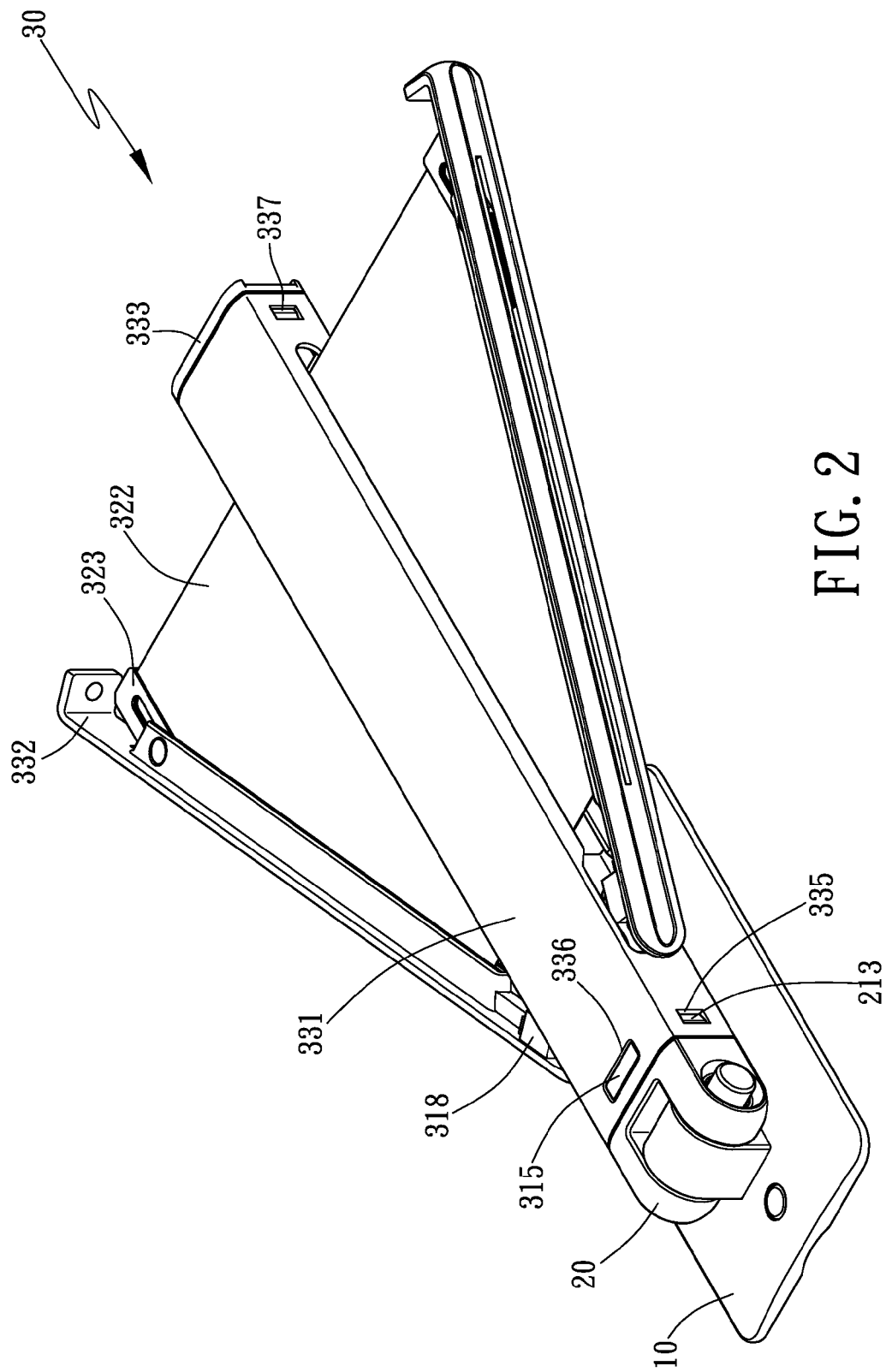
FIG. 2 is an assembly view showing a stretched-out state of the double wing bicycle fender in accordance with the present invention.
Figure 3:
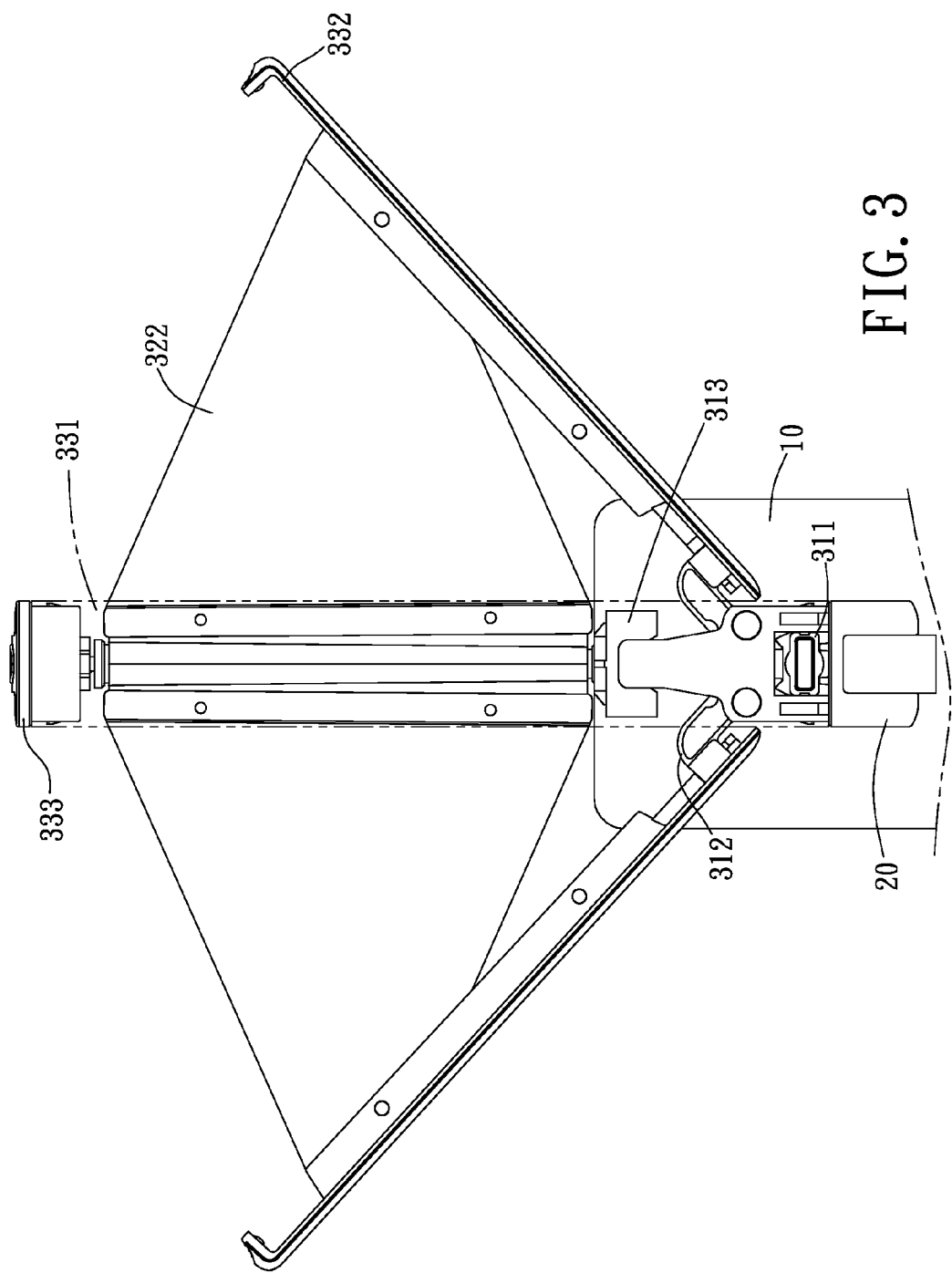
FIG. 3 is a perspective view showing the stretched-out state of the double wing bicycle fender in accordance with the present invention.
Figure 4:
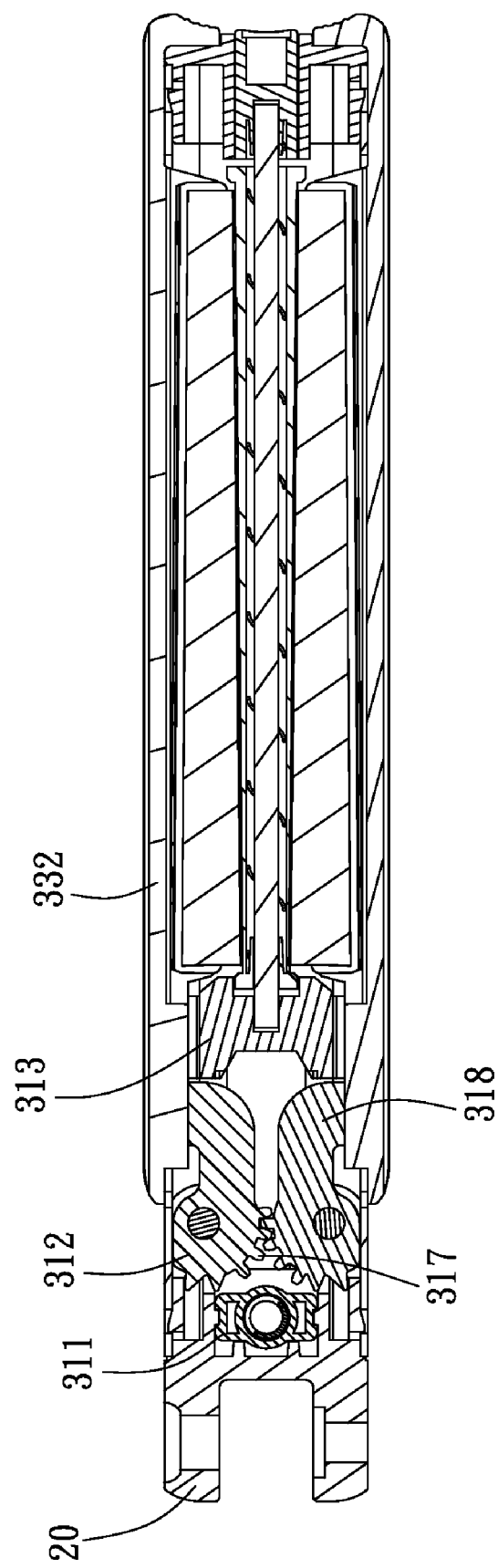
FIG. 4 is a cross sectional view showing a rolled-up state of the double wing bicycle fender in accordance with the present invention.

Referring to FIGS. 1-3, a double wing bicycle fender in accordance with the present invention is mounted on a bicycle having a plurality of frame pipes and comprises: a mounting member 10, a pivoting end cap 20, and a fender assembly 30.

The mounting member 10 is a laminate structure which is foldable and deformable and mounted on one of the frame pipes.

The pivoting end cap 20 has one end pivoted to the mounting member 10 and the other end defined with a pivoting portion 21 which includes two opposite sheet portions. At both sides of each of the two opposite sheet portions of the pivoting portion 21 are defined two assembling holes 211, and these assembling holes 211 are aligned in pairs. The pivoting portion 21 is defined with a directional-seat hole 212, and each of two opposite lateral sides of the pivoting end cap 20 is formed an engaging protrusion 213

The fender assembly 30 includes a directional assembly 31, a fender main body 32 and a fender-holding assembly 33. The fender main body 32 is received in the fender-holding assembly 33 and connected to the pivoting end cap 20 via the directional assembly 31.

The directional assembly 31 includes a directional seat 311, two movable members 312 and a positioning seat 313. The directional seat 311 is placed into the pivoting end cap 20 via the directional-seat hole 212 and includes two directional portions 314 and a positioning protrusion 315 which protrudes out of the directional-seat hole 212. The two movable members 312 are pivotally disposed between the two sheet portions of the pivoting portion 21 of the pivoting end cap 20 and each are provided with a plurality of positioning angles 316, teeth 317 and a connecting portion 318. The two movable members 312 are engaged with each other via the teeth 317, while the positioning angles 316 of the two movable members 312 are engaged with the two directional portions 314 of the directional seat 311. Each of the two movable members 312 is defined with an assembling hole 319 aligned with the assembling holes 211 of the pivoting portion 21 of the pivoting end cap 20, so that the movable members 312 are pivoted to the pivoting end cap 20 by rivets 40 inserted in the assembling holes 319, 211. The positioning seat 313 is disposed at the other end of the mounting member 10.

The fender main body 32 includes a shaft 321, two wings 322, two trim strips 323 and a positioning member 324. The shaft 321 has one end formed with a protruding shaft portion 325 which is pivotally connected to the positioning seat 313 by being inserted therein and the other end pivoted to the positioning member 324. Each of the wings 322 has one end fixed to and rolled up around the shaft 321, and the trim strips 323 are fixed to the other end of the wings 322, respectively.

The fender-holding assembly 33 includes a holding body 331, two plates 332 and a cover 333. Both lateral surfaces of the holding body 331 are defined with a plate-receiving slot 334 and two engaging holes 335 at both ends thereof respectively. In a top surface of the holding body 331 neighboring to the plate-receiving slots 334 is formed a directional-seat positioning hole 336. The pivoting end cap 20 is disposed at one end of the holding body 331 where the directional-seat positioning hole 336 is located, and the directional assembly 31 and the fender main body 32 are received in the holding body 331 in such a manner that the engaging protrusions 213 of the pivoting end cap 20 are engaged in the engaging holes 335 of the holding body 331, and the positioning protrusion 315 of the directional seat 311 protrudes out of the directional-seat positioning hole 336. The cover 333 is provided with two opposite protrusions 337 and a positioning-member receiving cavity 338 and mounted to the other end of the holding body 331 in such a manner that the protrusions 337 are engaged in the engaging holes 335 of the holding body 331. The two wings 322 of the fender main body 32 extend out of the plate-receiving slots 334 of the holding body 331 and are connected to one end of the respective plates 332, and the connecting portion 318 of the movable members 312 of the directional assembly 31 is engaged in the other end of the respective plates 332. The positioning member 324 of the fender main body 32 is pivotally connected to the cover 333 by being inserted in the positioning-member receiving cavity 338 therein. The fender main body 32 is positioned by pivotally connecting both ends of the shaft 321 to the positioning seat 313 on the holding body 331 and the cover 333, respectively.

Figure 5C:
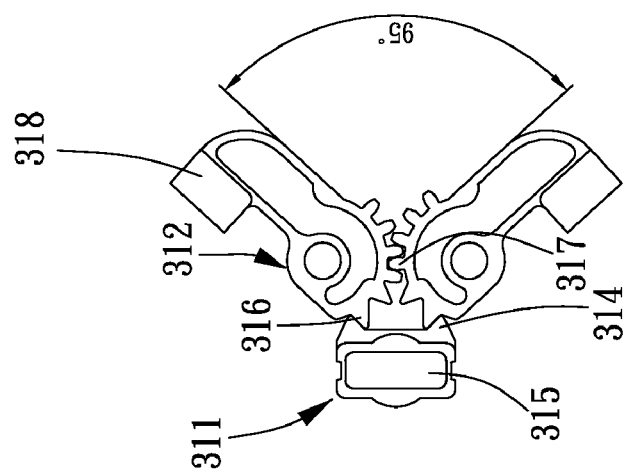
FIG. 5C is a third illustrative view showing the angle between the two movable members corresponding to the fully stretched-out state of the double wing bicycle fender in accordance with the present invention.
Figure 5B:
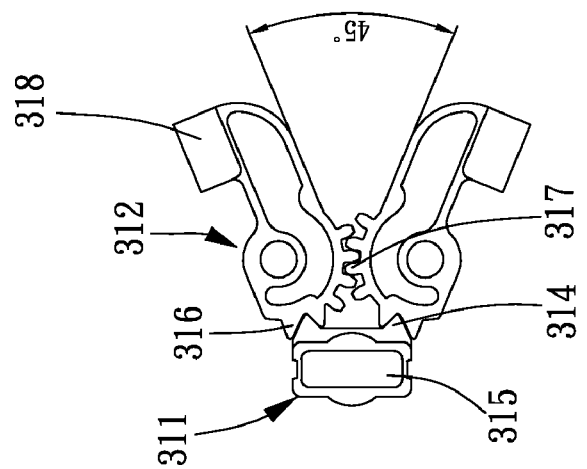
FIG. 5B is a second illustrative view showing the angle between the two movable members corresponding to a half stretched-out state of the double wing bicycle fender in accordance with the present invention.
Figure 5A:
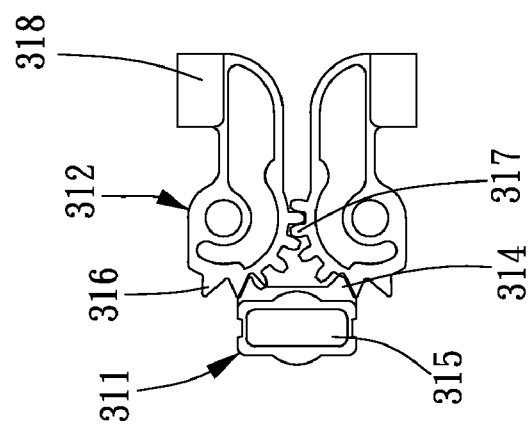
FIG. 5A is a first illustrative view showing the angle between the two movable members corresponding to the rolled-up state of the double wing bicycle fender in accordance with the present invention.

The above description shows that each of the two plates 332 has one end fixed to the trim strips 323 and the other end engaged with the connecting portion 318 of the movable members 312 of the directional assembly 31. Hence, by pulling the end of the each of the plates 332 which is fixed to the trim strips 323, the plates 332 will simultaneously pull the wings 322, so that the wings 322 will be reeled off the shaft 321. When one end of the wings 322 is pulled out, it will cause the motion of the end of the plates 332 which is connected to the movable members 312 and make the movable members 312 pivot in opposite directions from each other while the teeth 317 of the two movable members 312 are maintained in an engaged state, and the positioning angles 316 are maintained in an engaged relation with respect to the directional portions 314 of the directional seat 311. Hence, the two movable members 312 can be adjusted to have different angles therebetween through pivotal engagement of the teeth 317 and of the positioning angles 316 with the directional portions 314, as shown in FIGS. 5A, 5B and 5C, and FIG. 5C shows that the plates 332 are adjusted to the maximum angle. After the plates 332 are pulled out, the two wings 322 of the fender main body 32 will stretch out at both sides of the holding body 331 to protect rider from dust, mud and road debris.

Figure 6:
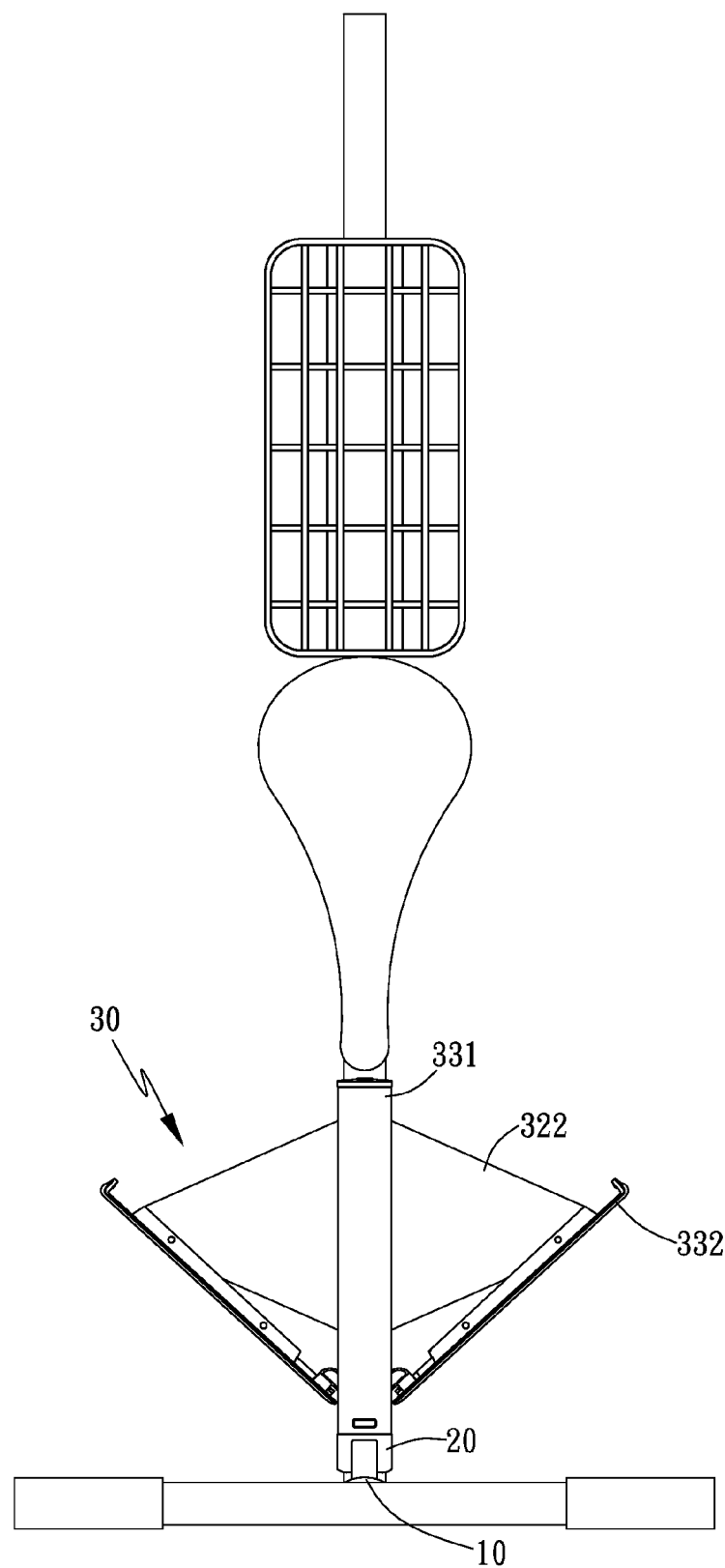
FIG. 6 shows that the double wing bicycle fender in accordance with the present invention is mounted on the frame pipe of a bicycle.

With the mounting member 10, the fender of the present invention can be mounted to one of the pipes of the bicycle frame A, as shown in FIG. 6, the mounting member 10 can be folded or deformed to adapt to the pipes of the bicycle frame and then is fixed thereon by double adhesive tape or hook and loop tape. When the user wants to use the fender main body 32, she/he can pull out the plates 332 of the fender-holding assembly 33 to make the wings 322 stretch out at both sides of the holding body 331 to protect rider from dust, mud and road debris. Furthermore, when the wings 322 stretch out, the effective width of the fender of the present invention for efficiently keeping off dust and road debris will be much larger than the width of the wheels of the bicycle and determined by the width of the wings 322 and the angle between the two movable members 312 of the directional assembly 31. When the user doesn't want to use the fender main body 32, she/he can push the plates 332 back to their original positions where the plates 332 cover the plate-receiving slots 334 of the holding body 331, so that the two wings 322 will be rolled up on the shaft 321 of the fender main body 32 again, and the fender main body 32 can be completely received in holding body 331, which not only saves space but is aesthetically pleasing.

While we have shown and described various embodiments in accordance with the present invention, it is clear to those skilled in the art that further embodiments may be made without departing from the scope of the present invention.

What is claimed is:

1. A double wing bicycle fender mounted on a bicycle which comprises a plurality of frame pipes, the double wing bicycle comprising:
    a mounting member being a laminate structure and mounted on one of the frame pipes of the bicycle;
    a pivoting end cap with one end pivoted to the mounting member and the other end defined with a pivoting portion;
    a directional assembly including a directional seat and at least one movable member, the directional seat being placed into the pivoting portion of the pivoting end cap and including at least one directional portion, the movable member being pivotally disposed in the pivoting portion of the pivoting end cap and provided with a plurality of positioning angles and a connecting portion, the positioning angles of the movable member being engaged with the directional portion of the directional seat;
    a holding body, at one end of which the pivoting end cap is disposed; and
    a fender main body including a shaft and at least one wing with one end fixed to and rolled up on the shaft, the shaft being pivotally inserted in the holding body, and the other end of the wing extending out of a lateral side of the holding body and being connected to the connecting portion of the movable member.

2. The double wing bicycle fender as claimed in claim 1, wherein the pivoting portion of the pivoting end cap includes two opposite sheet portions, at both sides of each of the two opposite sheet portions of the pivoting portion are defined two assembling holes, and these assembling holes are aligned in pairs, the pivoting portion is defined with a directional-seat hole, the directional seat is placed into the pivoting end cap via the directional-seat hole and includes a positioning protrusion which protrudes out of the directional-seat hole, the movable member is defined with an assembling hole aligned with the assembling holes of the pivoting end cap, so that the movable member is pivoted to the pivoting end cap by rivets inserted in the assembling holes of the movable member and the pivoting end cap.

3. The double wing bicycle fender as claimed in claim 2, wherein the directional assembly includes two movable members each of which is provided with a plurality of teeth, and the two movable members are engaged with each other via the teeth.

4. The double wing bicycle fender as claimed in claim 3, wherein the movable member is pivotally disposed between the two sheet portions of the pivoting portion.

5. The double wing bicycle fender as claimed in claim 3 further comprising two plates each of which has one end fixed to a trim strip and the other end engaged with the connecting portion of the movable members, wherein the fender main body includes two wings and two said trim strips, each of the wings has one end fixed to and rolled up around the shaft, and the two trim strips are fixed to the other end of the wings, respectively.

6. The double wing bicycle fender as claimed in claim 5, wherein both lateral surfaces of the holding body are defined with a plate-receiving slot, respectively, the two wings of the fender main body extend out of the plate-receiving slots of the holding body.

7. The double wing bicycle fender as claimed in claim 6, wherein a directional-seat positioning hole is formed in a top surface of the holding body neighboring to the plate-receiving slots, the pivoting end cap is disposed at one end of the holding body where the directional-seat positioning hole is located, and the positioning protrusion of the directional seat protrudes out of the directional-seat positioning hole.

8. The double wing bicycle fender as claimed in claim 1, wherein the directional assembly includes a positioning seat which is disposed at one end of the mounting member, the shaft has one end formed with a protruding shaft portion which is pivotally connected to the positioning seat by being inserted therein, and the fender main body further includes a positioning member which is pivoted to the other end of the shaft.

9. The double wing bicycle fender as claimed in claim 8, wherein the pivoting end cap is disposed at one end of the holding body, the directional assembly and the fender main body are received in the holding body, a fender-holding assembly includes a cover which is mounted to the other end of the holding body, and at both ends of both lateral surfaces of the holding body are defined two engaging holes for engaging with engaging protrusions of the pivoting end cap and protrusions of the cover.

10. The double wing bicycle fender as claimed in claim 9, wherein the cover is provided with a positioning-member receiving cavity in which the positioning member of the fender main body is received.

\* \* \* \* \*